United States Patent [19]

Model et al.

[11] 3,944,547
[45] Mar. 16, 1976

[54] IMINOISOINDOLINONE PIGMENTS

[75] Inventors: Ernst Model, Basel; Jost von der Crone; André Pugin, both of Riehen, all of Switzerland

[73] Assignee: Ciba-Geigy Corporation, Ardsley, N.Y.

[22] Filed: Aug. 5, 1974

[21] Appl. No.: 494,942

[30] Foreign Application Priority Data
Aug. 16, 1973 Switzerland.................. 11805/73

[52] U.S. Cl...... 260/248 CS; 260/249.5; 260/42.21; 260/37 P; 106/288 Q; 106/308 N; 8/162 R
[51] Int. Cl.².............. C07D 251/24; C07D 251/42
[58] Field of Search.................. 260/248 CS, 249.5

[56] References Cited
UNITED STATES PATENTS
3,814,719    6/1974    Seltzer et al..................... 260/248

*Primary Examiner*—John M. Ford
*Attorney, Agent, or Firm*—Vincent J. Cavalieri

[57] ABSTRACT

New Iminoisoindolinone pigments of the formula

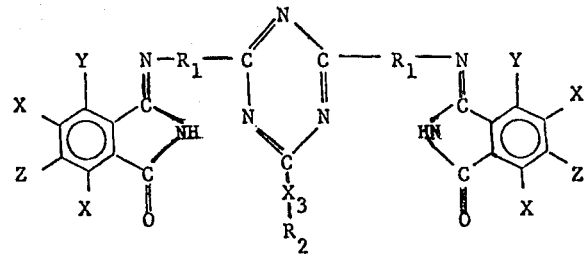

wherein $R_1$ denotes aromatic radicals, $R_2$ denotes an H atom, and alkyl group containing 1–6 C atoms, a cycloalkyl group containing 5–6 C atoms or an isocyclic or heterocyclic aromatic radical, $X_3$ denotes a direct bond or an imino group, the X denote halogen atoms, and Y and Z denote halogen atoms, alkoxy or alkylmercapto groups containing 1–6 C atoms, cycloalkoxy groups containing 5–6 C atoms, aralkoxy, aryloxy or arylmercapto groups, which are useful for pigmenting high molecular organic material.

6 Claims, No Drawings

NEW IMINOISOINDOLINONE PIGMENTS

It has been found that new, valuable iminoisoindolinone pigments of the formula

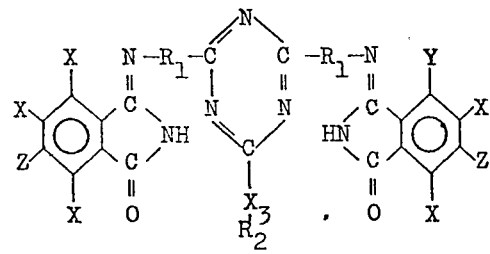

wherein $R_1$ denotes aromatic radicals, $R_2$ denotes a H atom, an alkyl group containing 1–6 C atoms, a cycloalkyl group containing 5–6 C atoms or an isocyclic or heterocyclic aromatic radical, $X_3$ denotes a direct bond or an imino group, the X denote halogen atoms, and Y and Z denote halogen atoms, alkoxy or alkylmercapto groups containing 1–6 C atoms, cycloalkoxy groups containing 5–6 C atoms, aralkoxy, aryloxy or arylmercapto groups, are obtained when an isoindolinone of the formula

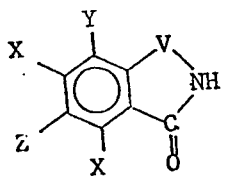

wherein V denotes a group of the formula

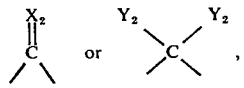

wherein $X_2$ denotes an imino or thio group and the $Y_2$ denote halogen atoms or alkoxy or secondary amino groups, is condensed with a diamine of the formula

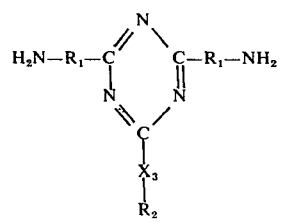

in the molar ratio of 2:1.

Pigments of particular interest are those of the formula

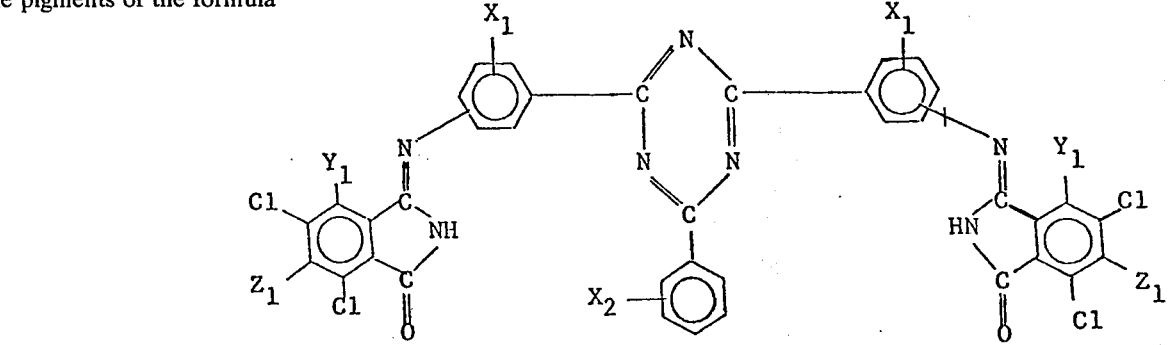

wherein $X_1$ denotes a H atom or a methyl group, $X_2$ denotes a H atom or a methyl or phenyl group and $Y_1$ and $Z_1$ denote chlorine atoms or alkoxy groups containing 1–4 C atoms, and especially those wherein $Y_1$ and $Z_1$ denote chlorine atoms.

The starting materials used are preferably iminoisoindolinones of the formula

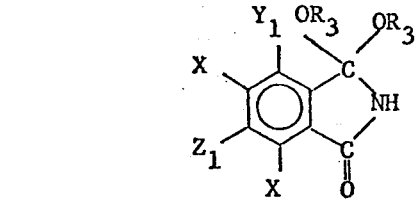

wherein X and $Y_1$ and $Z_1$ have the indicated meaning and $R_3$ denotes an alkyl group, containing 1–4 carbon atoms, and especially those wherein X and $Y_1$ and $Z_1$ denote chlorine atoms. Those starting materials wherein $Y_1$ and $Z_1$ denote chlorine atoms are known, whilst those wherein $Y_1$ and $Z_1$ denote alkoxy, cycloalkoxy, aralkoxy, aryloxy, alkylthio or arylthio groups can be obtained by the process of DOS 2,301,863 by reacting an ammonium salt or ester of tetrachloro-o-cyanobenzoic acid, in a hydrophilic organic solvent, with a compound of the formula $Y_1Me$, wherein $Y_1$ has the above-mentioned meaning and Me denotes an alkali metal atom, and, if necessary, esterifying the resulting product and reacting it with a Na alcoholate.

The following may be mentioned as examples of iminoisoindolinones: 3,3-dimethoxy-4,5,6,7-tetrachloro-isoindolinone, 3,3-dimethoxy-4,5,6,7--tetrabromo-isoindolinone, 3,3,6-trimethoxy-4,5,7-trichloro-isoindolinone, 3,3-dimethoxy-4,5,7-trichloro-6-butoxy-isoindolinone, 3,3-dimethoxy-4,5,7-trichloro-6-phenoxy-isoindolinone, 3,3-dimethoxy-4,5,7-trichloro-6-(p-chlorophenoxy)-iso-indolinone, 3,3-dimethoxy-4,5,7-trichloro-6-(o-methylphenoxy)-isoindolinone, 3,3-dimethoxy-4,5,7-trichloro-6-methylmercapto-isoindolinone, 3,3-dimethoxy-4,5,7-trichloro-6-ethylmercapto-isoindolinone and 3,3,4,6-tetramethoxy-dichloro-isoindolinone.

The diamines used are preferably those of the formula

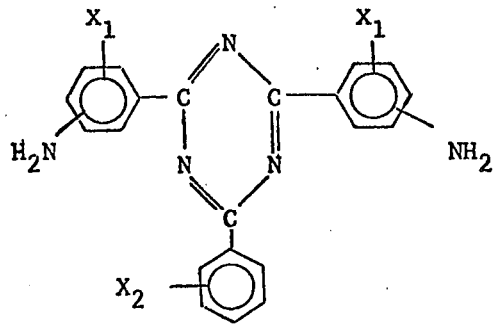

wherein $X_1$ and $X_2$ have the indicated meaning.

The following diamines may be mentioned as examples: 2,4-bis-(3'-aminophenyl)-s-triazine, 2-phenyl-4,6-bis-(3'-aminophenyl)-s-triazine, 2-phenyl-4,6-bis-(4'-aminophenyl)-s-triazine, 2-phenyl-4,6-bis-(2'-methyl-4'-aminophenyl)-s-triazine, 2-methyl-4,6-bis-(4'-aminophenyl)-s-triazine, 2-cyclohexyl-4,6-bis-(3'-aminophenyl)-s-triazine, 2-(3'-pyridyl)-4,6-bis-(3'-aminophenyl)-s-triazine, 2-phenyl-4,6-bis-(5'-aminopyridyl-2')-s-triazine, 2-dimethylamino-4,6-bis-(4'-aminophenyl)-s-triazine, 2-anilino-4,6-bis-(4'-aminophenyl)-s-triazine and 2-methylamino-4,6-bis-(4'-aminophenyl)-s-triazine.

The diamines mentioned are known compounds which can be obtained, for example, in accordance with the process of U.S. Pat. No. 3,700,665, by condensation of a nitrobenzamidine with a carboxylic acid anhydride.

The condensation of the halogenoisoindolinone with the amine is carried out in part in the cold, but with warming of the intimately mixed components if appropriate, and particularly advantageously in the presence of inert organic solvents, that is to say organic solvents which do not participate in the reaction.

If 3-imino-, 3-thio- or 3,3-bis-sec.amino-4,5,6,7-tetrachloroisoindolin-1-ones or alkali metal salts of the 3,3-dialkoxy-4,5,6,7-tetrachloroisoindolin-1-ones are used as starting materials, water-miscible organic solvents, for example lower aliphatic alcohols, such as lower alkanols, for example methanol, isopropanol or butanol, lower cyclic ethers, such as dioxane, ethylene glycol monomethyl ether or lower aliphatic ketones, such as acetone, are used with advantage. In these cases, the condensation takes place even at relatively low temperatures. The reaction is advantageously carried out in the presence of agents which bind bases; as examples of such agents there should be mentioned lower fatty acids, which then simultaneously act as solvents, and especially acetic acid.

When using 3,3-dihalogeno-4,5,6,7-tetrachloroisoindolin-1-ones, organic solvents which are free of hydroxyl groups are preferred, such as hydrocarbons, for example aromatic hydrocarbons, such as benzene, toluene, xylene, tetrahydronaphthalene or diphenyl, or cycloaliphatic hydrocarbons, for example cyclohexane, but also halogenated hydrocarbons, such as aliphatic halogenated hydrocarbons, for example carbon tetrachloride or tetrachloroethylene, or aromatic halogenated hydrocarbons, such as chlorobenzene or dichlorobenzenes and trichlorobenzenes, as well as aromatic nitro-hydrocarbons, such as nitrobenzenes, ethers, in particular aliphatic ethers, such as dibutyl ether, aromatic ethers, such as diphenyl ether, or cyclic ethers, such as dioxane, and also ketones, such as acetone, or esters, particularly esters of lower fatty acids with lower alkanols, such as ethyl acetate, these organic solvents being used in the presence of acid-binding agents.

The new pigments precipitate from the reaction medium immediately after they have formed. For some purposes, they can be used direct as the crude pigments; however, they can also be improved further in their properties, especially with regard to purity, form and hiding power, in accordance with methods which are in themselves known, for example by extraction with organic solvents or by grinding with grinding auxiliaries which can subsequently be removed again, for example salts, or by alkaline reprecipitation.

The new dyestuffs are valuable pigments which can be used, in a finely divided form, for pigmenting high molecular organic material, for example cellulose ethers and cellulose esters, such as ethylcellulose, acetylcellulose and nitrocellulose, polyamides or polyurethanes or polyesters, natural resins or synthetic resins, for example aminoplasts, especially urea-formaldehyde and melamine-formaldehyde resins, alkyd resins, phenoplasts, polycarbonates, polyolefines, such as polystyrene, polyvinyl chloride, polyethylene, polypropylene, polyacrylonitrile and polyacrylic acid esters, thermoplastic or thermosetting acrylic resins, rubber, casein, silicone and silicone resins, individually or as mixtures. It is immaterial whether the high molecular compounds mentioned are in the form of plastic compositions or melts or in the form of spinning solutions, lacquers or printing inks. Depending on the end use, it proves advantageous to employ the new pigments as toners or in the form of preparations.

The dyeings obtained are distinguished by high tinctorial strength, high purity of colour shade and good fastness to overlacquering, light and weathering.

In the examples which follow, the percentages denote percentages by weight.

EXAMPLE 1

A hot solution of 8.5 g of 2-phenyl-4,6-bis-(4'-aminophenyl)-s-triazine in 850 ml of 1,2-dichlorobenzene is added to a solution of 17 g of 3,3,4,5,6,7-hexachloro-isoindolin-1-one in 100 ml of 1,2-dichlorobenzene. A greenish-tinged yellow precipitate forms immediately. The suspension is heated to 140°–145°C for 2 hours, while stirring.

The insoluble pigment is filtered off at 120°C and washed with methanol, acetone and water. After drying, 16 g of a yellow powder are obtained, which can be used, in this form, for colouring plastics and for incorporation into lacquers and printing inks. The colourations obtained therewith are distinguished by outstanding fastness properties.

EXAMPLE 2

17.25 g of 3,4,5,6-tetrachloro-2-cyanobenzoic acid methyl ester and 57.5 ml of a 1N sodium methylate solution in methanol are stirred to form a clear solution. The sodium salt of 3,3-dimethoxy-4,5,6,7-tetrachloroisoindolin-1-one is produced. 8.5 g of 2-phenyl-4,6-bis-(4'-aminophenyl)-s-triazine and 100 ml of 1,2,-dichlorobenzene are now added, while stirring well. The temperature is now raised to 100°C over the course of 3 hours, and maintained thereat for 2 hours, whilst methanol distils off. The residue is diluted with a further 100 ml of 1,2-dichlorobenzene and acidified with 15 ml of glacial acetic acid, and the resulting green-yellow pigment suspension is heated to 120°C as rapidly as possible and is filtered immediately. After washing with methanol, acetone and water, and drying in vacuo at 90°–100°C, 19.8 g of the dyestuff described in Example 1 are obtained.

EXAMPLE 3

If instead of 3,4,5,6-tetrachloro-2-cyanobenzoic acid methyl ester equimolecular amounts of 3,4,5,6-tetrabromo-2-cyanobenzoic acid methyl ester (melting point 122°–124°C) are used, and the procedure indicated is followed, a yellow pigment is obtained, which, when incorporated into coloured lacquers, gives colourations of excellent fastness to light and to weathering.

EXAMPLE 4

If instead of 3,4,5,6-tetrachloro-2-cyanobenzoic acid methyl ester the equimolar amount of 3,4,6-trichloro-5-methoxy-2-cyanobenzoic acid methyl ester is used, a yellow pigment with comparably good properties is obtained.

EXAMPLES 5–13

If, in Example 2, the 2-phenyl-4,6-bis-(4'-aminophenyl)-s-triazine is replaced by corresponding amounts of the triazines listed in the table which follows, yellow pigments with comparably good properties are obtained:

5. 2-phenyl-4,6-bis(2'-methyl-4'-aminophenyl)-s-triazine
6. 2,4-bis(3'-aminophenyl)-s-triazine
7. 2,4-bis(4'-aminophenyl)-s-triazine
8. 2-methyl-bis-(4'-aminophenyl)-s-triazine
9. 2-cyclohexyl-4,6-bis(3'-aminophenyl)-s-triazine
10. 2-cyclohexyl-4,6-bis(4'-aminophenyl)-s-triazine
11. 2-dimethylamino-4,6-bis(4'-aminophenyl)-s-triazine
12. 2-anilino-4,6-bis(4'-aminophenyl)-s-triazine
13. 2-p-tolyl-4,6-bis(4'-aminophenyl)-s-triazine

EXAMPLE 14

2 g of the pigment prepared according to Example 1 are ground with 36 g of alumina hydrate, 60 g of linseed oil varnish of medium viscosity and 2 g of cobalt linoleate on a triple-roll mill. The greenish-tinged yellow prints produced with the colour paste obtained are deeply coloured and have outstanding fastness to light.

EXAMPLE 15

0.6 g of the pigment prepared according to Example 2 is mixed with 67 g of polyvinyl chloride, 33 g of dioctylphthalate, 2g of dibutyl-tin dilaurate and 2 g of titanium dioxide and the mixture is processed for 15 minutes on a roll mill at 160°C, to give a thin sheet. The greenish-tinged yellow colouration thus produced is deep in colour and fast to migration, heat and light.

EXAMPLE 16

10 g of titanium dioxide and 2 g of the pigment prepared according to Example 2 are ground for 48 hours with 88 g of a mixture of 26.4 g of coconut alkyd resin, 24.0 g of melamine-formaldehyde resin (50% solids content), 8.8 g of ethylene glycol monomethyl ether and 28.8 g of xylene in a ball mill.

If this lacquer is sprayed onto an aluminium foil, pre-dried for 30 minutes at room temperature and stoved for 30 minutes at 120°C, a yellow lacquering is obtained, which is very deep in colour and is distinguished by very good fastness to overlacquering, light and weathering.

What we claim is:

1. A compound of the formula

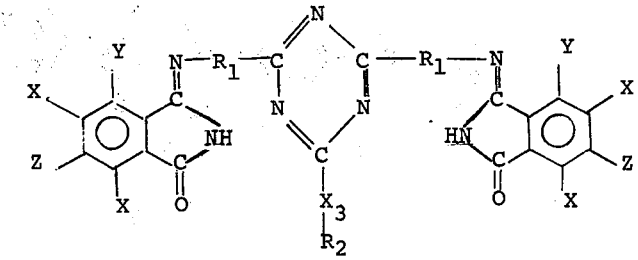

wherein $R_1$ is an aromatic radical of the formula wherein $X_1$ is hydrogen or methyl group, $R_2$ is hydrogen, an alkyl group containing 1–6 C atoms, a cycloalkyl group containing 5–6 C atoms or an isocyclic or heterocyclic aromatic radical selected from phenyl, tolyl and 3-pyridyl, $X_3$ is a direct bond or an imino group, the X is halogen atoms, and Y and Z are halogen atoms, alkoxy or alkylmercapto groups containing 1–6 C atoms, cycloalkoxy groups containing 5–6 C atoms, or aryloxy selected from phenoxy, methylphenoxy and chlorophenoxy.

2. A Compound of claim 1 of the formula

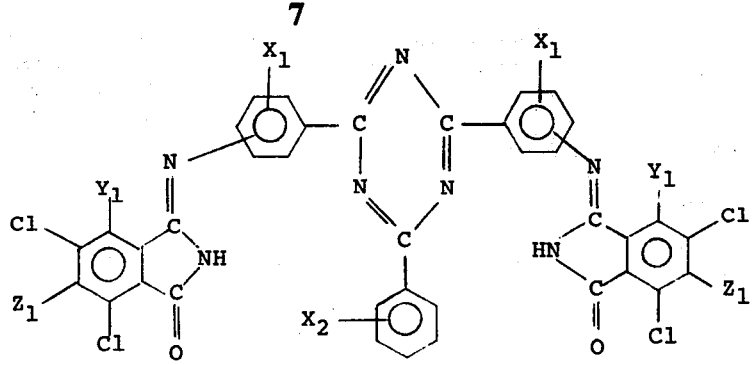
wherein $X_1$ is hydrogen or methyl group, $X_2$ is hydrogen, methyl or phenyl group, and $Y_1$ and $Z_1$ are chlorine.
3. A compound of claim 2, wherein $Y_1$ and $Z_1$ are chlorine atoms.
4. A compound of claim 1, of the formula
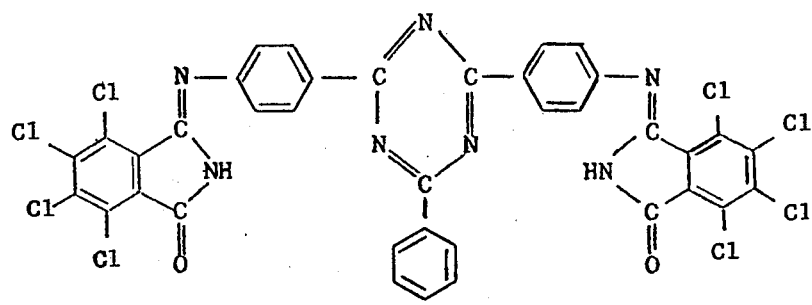
5. A compound of claim 1, of the formula
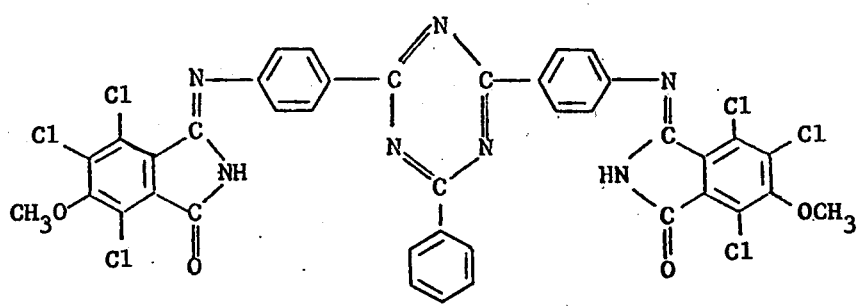
6. A compound of claim 1, of the formula
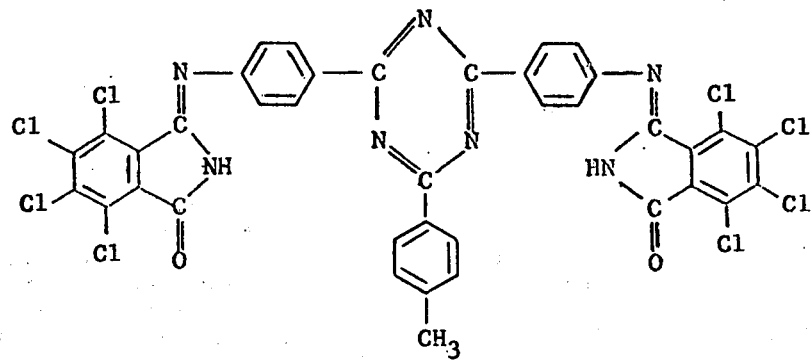
* * * * *